United States Patent [19]
Jensen

[11] Patent Number: 5,304,744
[45] Date of Patent: * Apr. 19, 1994

[54] METHOD OF COLLECTING AND RECORDING REFUSE

[76] Inventor: Asger R. Jensen, Frugthaven 37, DK-5462 Morud, Denmark

[ * ] Notice: The portion of the term of this patent subsequent to May 11, 2010 has been disclaimed.

[21] Appl. No.: 18,791

[22] Filed: Feb. 17, 1993

Related U.S. Application Data

[63] Continuation of Ser. No. 839,587, Feb. 21, 1992, Pat. No. 5,209,312.

[51] Int. Cl.⁵ .................... G01G 19/08; B65G 69/00; B65F 3/02
[52] U.S. Cl. .................... 177/136; 177/145; 177/139; 414/21; 414/408
[58] Field of Search .................... 177/136, 145, 139; 414/21, 408

[56] References Cited

U.S. PATENT DOCUMENTS 5,209,312  5/1993  Jensen .................... 177/136

Primary Examiner—George H. Miller, Jr.
Attorney, Agent, or Firm—Darby & Darby

[57] ABSTRACT

A method of recording refuse in a container, where the refuse is poured into a container suspended in weighing cells on a refuse collection truck makes the weighing cells give an input to a computing device which calculates and records the weight of the refuse. The weighing container is then emptied, after which a new quantity of refuse can be weighed. For identification purposes each container is fitted with a transponder signalling to the computing device. The quantity of refuse in each container is hereby recorded thus permitting billing by quantity.

22 Claims, 5 Drawing Sheets

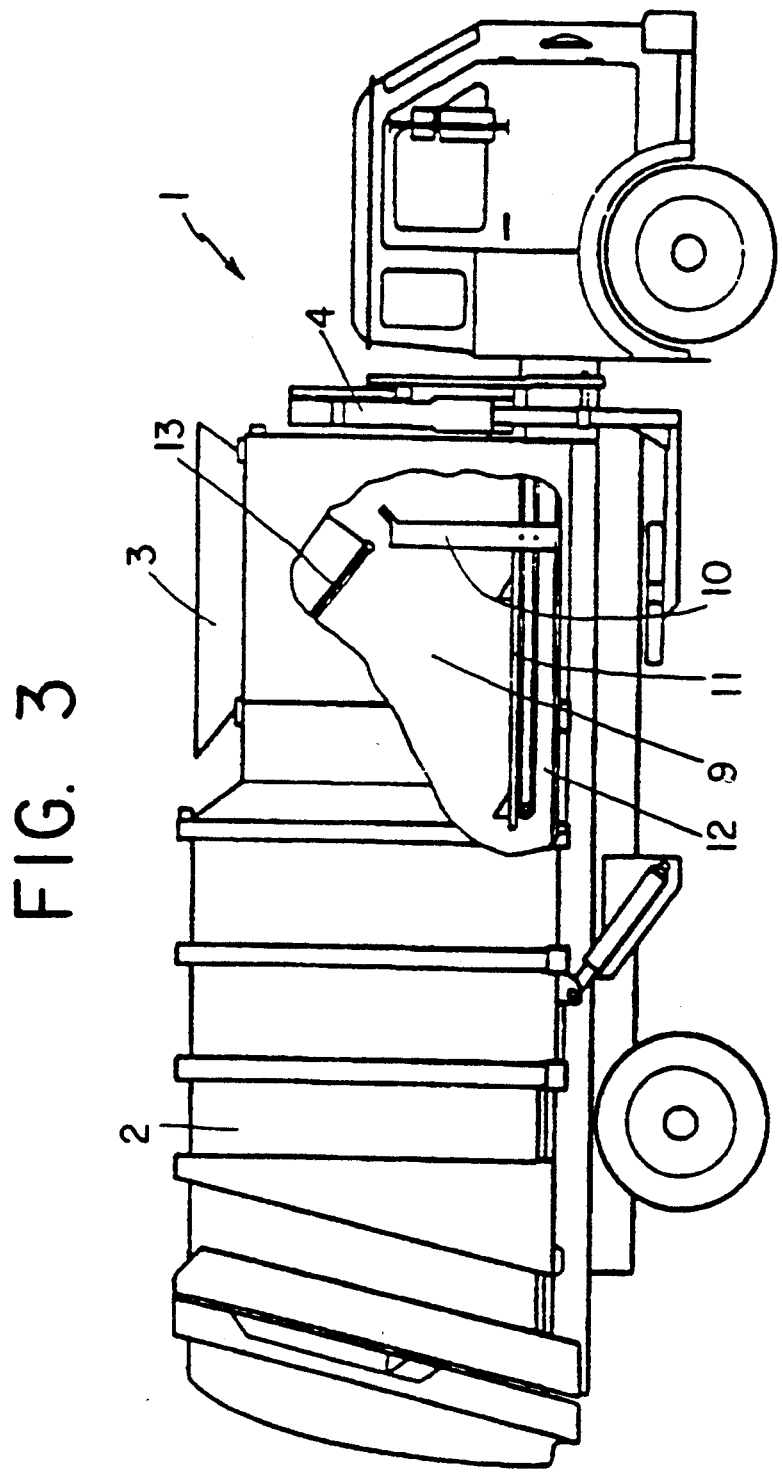

METHOD OF COLLECTING AND RECORDING REFUSE

This is a continuation of application Ser. No. 07/839,587, filed Feb. 21, 1992, U.S. Pat. No. 5,209,312.

BACKGROUND OF THE INVENTION

1. Field of the invention

Invention relates to a method and an equipment for collecting refuse placed in a container standing along the road, where a refuse collection truck can stop and by means of a, lift the container up and dump the refuse into the refuse container of the truck, after which the container is again returned to its place so that the truck may drive along to the next stop and empty another container.

2. Disclosure of the prior art

Examples are known of methods of determining the weight of for instance the load on a truck.

Such a weighing system is known from USSN No. 4,638,876 whore a weighing plate is suspended in spherical bearings on at least three bar-shaped strain-gauge-transducers. These weighing cells provide input to a computing device whereby the weight on the weighing plate is recorded even when weighing eccentrically loaded weights.

This known weighing method is, however, not particularly suited for the weighing of refuse which must be weighed in comparatively small amounts every time it is dumped in the body.

In order to be able to determine the weight of the contents, each container can of course be weighed on a portable scale prior to each emptying. This method is, however, not particularly expedient since it requires manual weighing and handling of each container, before their contents are emptied into the truck.

SUMMARY OF THE INVENTION

A method of collecting and recording the weight of refuse, said refuse being placed in small containers which are lifted by means of a lift on a refuse collection truck, and said refuse being dumped from the container into the refuse container of the truck, and wherein the refuse is first led to a weighing container suspended in weighing cells in such a manner that the weight of the refuse is recorded, whereupon the refuse is discharged from the container down onto a compressor which moves the refuse into the storage chamber of the refuse container.

This makes it possible in a surprisingly simple manner to record the weight of the refuse in each container while at the same time relating the weight to a particular container.

This permits a continuous recording of the refuse and permits billing to take place on the basis of the collected quantity of refuse. First of all, this results in correct billing since each container owner will only have to pay for that quantity of refuse which he actually delivers; secondly, it permits a continuous monitoring of the quantity of refuse.

Moreover, the total quantity of refuse in the truck body is easily determined by a simple addition of the weighing results, which is of importance for the delivery of the refuse and possible recording of the weight of the delivered refuse.

The method will thus be an incentive for people to re-use or recycle, because a reduction of the quantity of refuse can be rewarded financially.

Furthermore, the method can be applied while the driver remains in the cab since the lift is remotely operable; emptying can thus be performed automatically.

In order to simplify recording of the weight, each container can according to the invention be provided with a transponder which at a given signal from a radio signal on the truck can transmit data to the computing device about the ownership of the container etc.

The suspension of the weighing container in transducers creates an input to the computing device which calculates the weight. This permits recording and weighing to happen automatically with no need for the driver to leave the cab.

To ensure a complete emptying of the weighing container, it is provided with a slide which opens an opening at the bottom, whereby the container is completely emptied after each weighing.

The slide is moved by two hydraulic cylinders that these are automatically actuated for opening the slide following each weighing.

In order to make sure that the weight is correctly measured, even if the refuse is unevenly distributed in the container, the container is suspended in four bar transducers, viz. two at the top of the one side and two approximately in the centre of the opposite side of the container. Hence, the sum of the four inputs from the transducers will create a reliable expression of the weight even when unevenly distributed in the container.

In order also to obtain correct measurement results when the truck is parked on sloping ground, for instance on a hill, the bearing of each transducer may be designed as spherical surfaces providing a uniform recording even if the truck leans.

The further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus are not limitative of the present invention and wherein:

FIG. 3 shows the truck seen from the side and with a section for illustration of the compressor below the weighing container.

DESCRIPTION OF A PREFERRED EMBODIMENT

Figure 2:
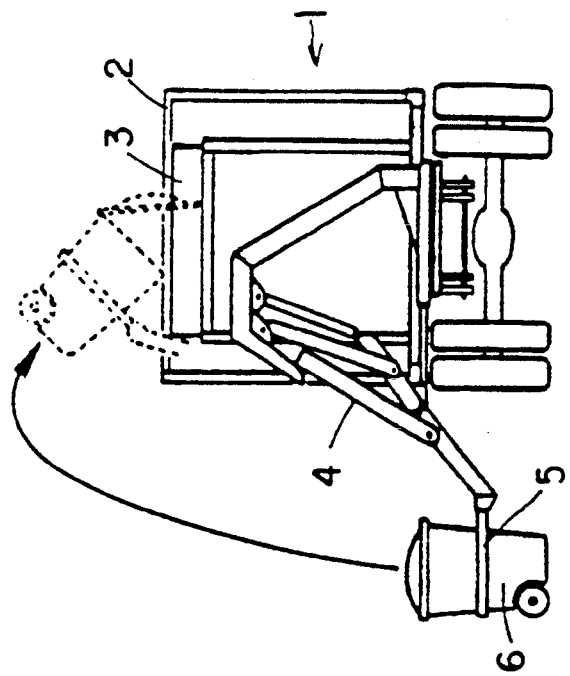
FIG. 2 shows the lift and container seen in the direction II—II in FIG. 1.
Figure 1:
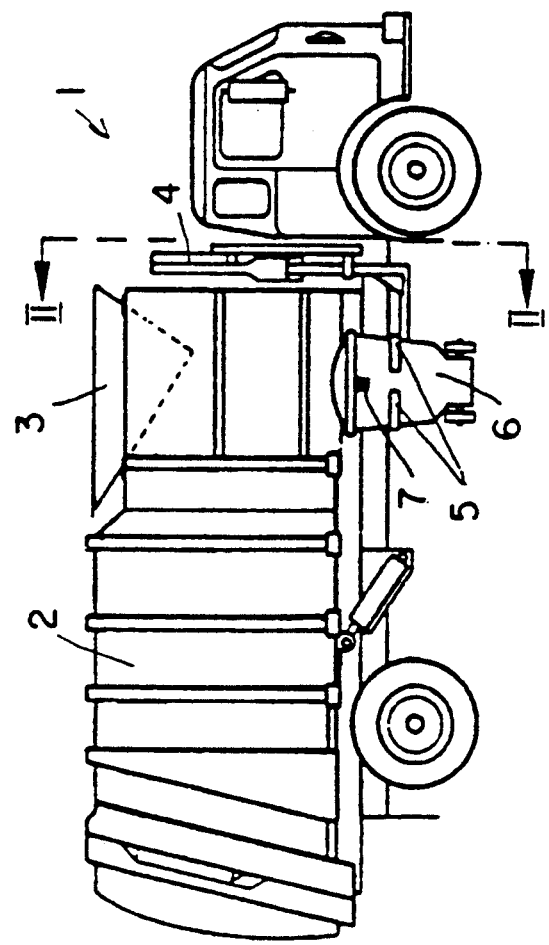
FIG. 1 shows an example of a refuse collection truck seen from the side and parked opposite a container.

FIGS. 1-3 show an example of a refuse collection truck 1.

The truck is provided with a refuse container 2 in which refuse is filled, weighed and compressed.

As shown in FIGS. 1 and 2, the truck is provided with a side lift 4 which at its end has grabbers 5 grabbing around a refuse collection container 6 positioned on the ground and the truck is parked opposite it.

The lift 4 and the grabbers 5 are operated from the cab of the truck in such a manner that the collection container 6 is lifted up and tilted whereby the refuse will fall down into a weighing container 3 suspended at the top in the front part of the refuse container 2.

After emptying of the container 6, it is returned to its position on the ground.

Each container 6 is provided with an electronic transponder 7 enabling identification of each container by means of the signal transmitted by the transponder to a radio in the truck.

Identification can be recorded in a commonly known manner and be printed out on a slip which may also contain information as to the weight of the refuse, as will later be explained.

When the refuse is poured into the weighing container 3, the weight will be recorded, as will also be explained later, whereupon emptying of the container 3 will take place by the refuse falling out through an opening at the side of the container 3 down onto the compressor 9 shown in FIG. 3.

The compressor 9 comprises a bottom 11 with a vertical plunger 10, which parts by means of a hydraulic drive 12, for instance by way of double-acting hydraulic cylinders, can be moved back into the refuse container 2 thereby moving and compressing the refuse.

The bottom 11 and plunger 10 are then returned to their starting positions, as shown in FIG. 3, after which the truck is ready for the next emptying.

Figure 4:
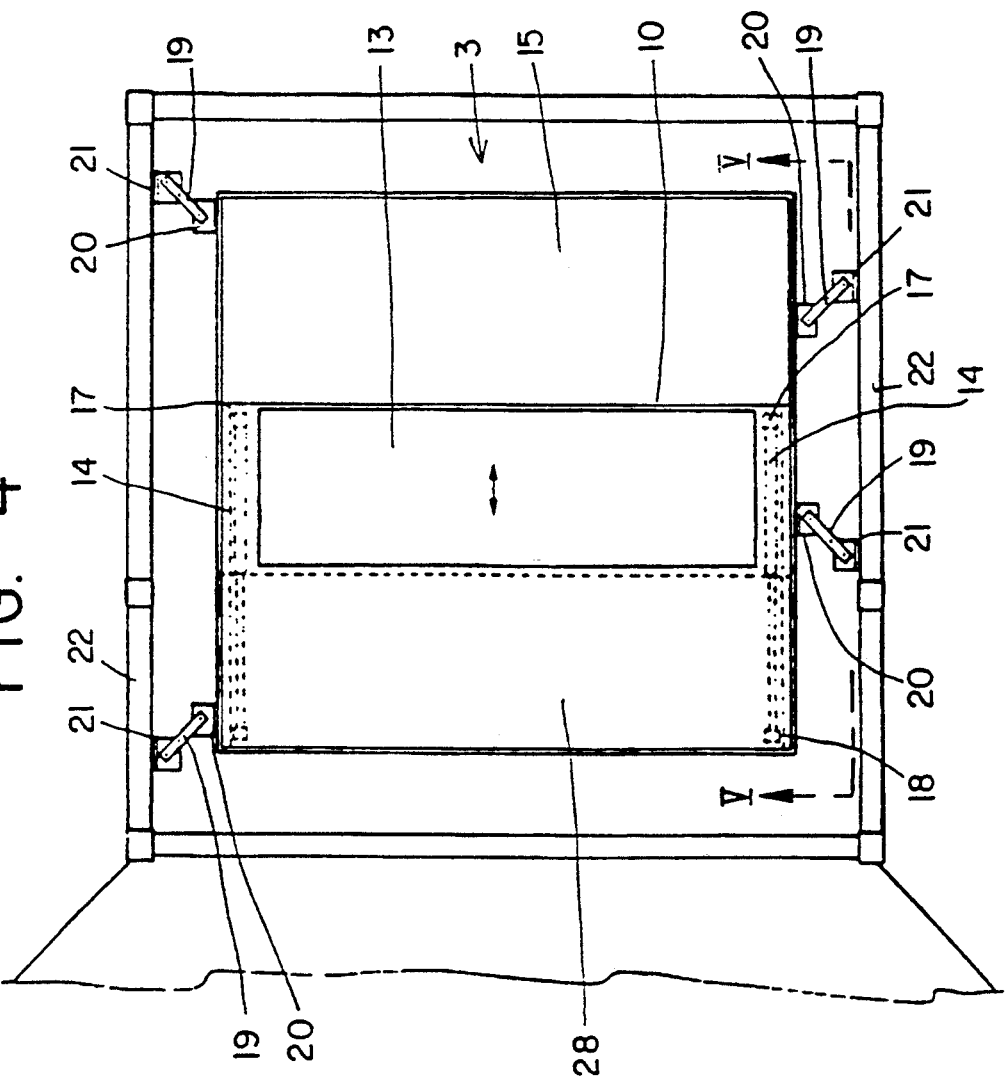
FIG. 4 shows the weighing container seen from above.
Figure 5:
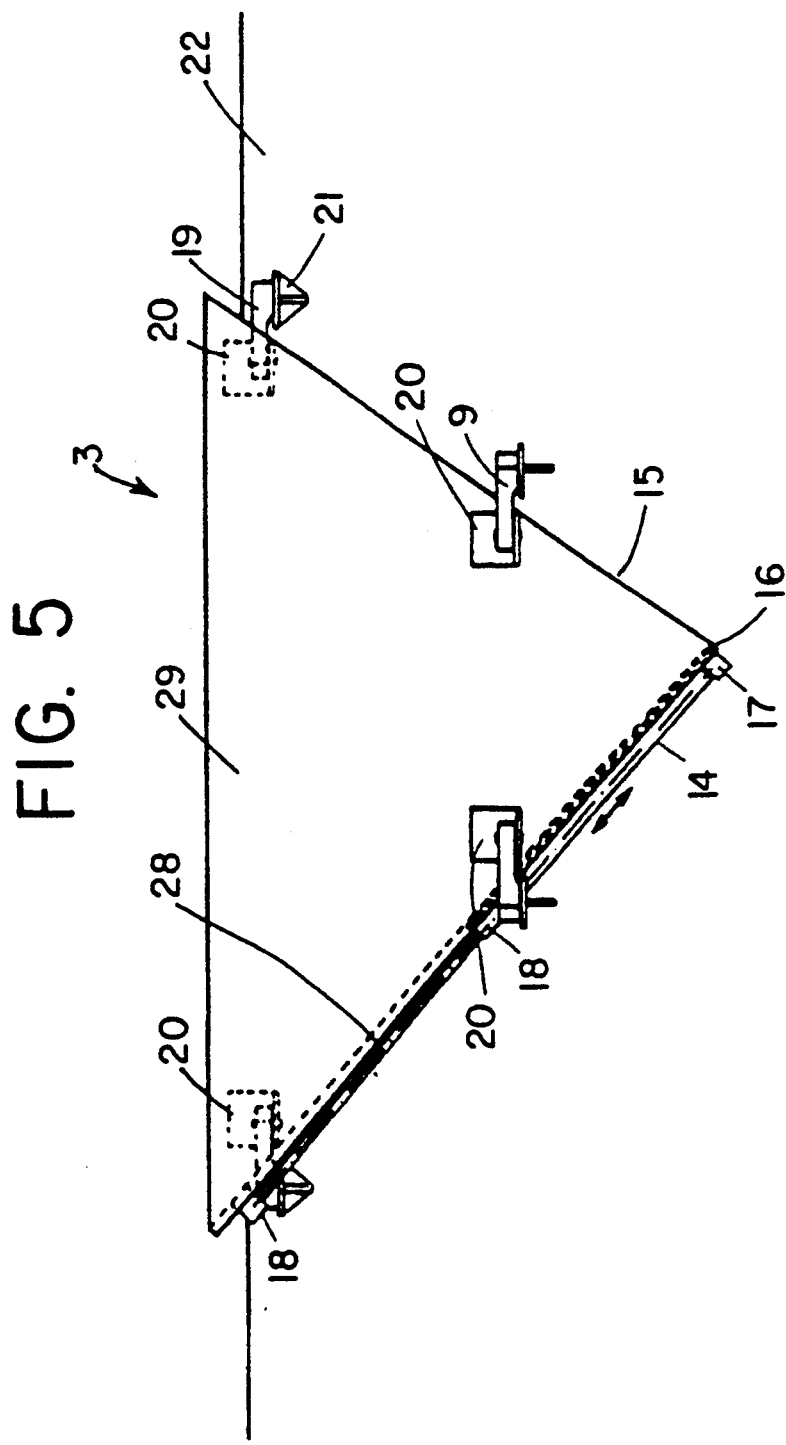
FIG. 5 shows the weighing container seen in the direction V—V in FIG. 4.

The weighing container 3 is shown in FIGS. 4 and 5. It is designed as a funnel-shaped box with two rectangular side walls 15 and 28 which meet at the bottom in a container bottom 16, and with two triangular end walls 29.

At the bottom of one side wall 28 an opening is formed which is covered by a slide plate 13 which can be displaced so that the refuse in the container can fall out through the opening.

The slide plate 13 is controlled at both sides enabling the plate to slide upwards and downwards along the side wall 28. In each side there is moreover mounted a hydraulic cylinder 14 whose stationary part is secured at the bottom at a base 17 near the bottom 16.

The moving part of the cylinder is secured to a base 18 on the slide plate 13 causing the plate 13 to slide upwards, as indicated by dash line in FIGS. 4 and 5, when the cylinders 14 are actuated.

The container 3 is suspended at four points, viz two at the top of the one side wall 29, and two at the centre of the opposite end wall 29, as shown in FIGS. 4 and 5.

Figure 6:
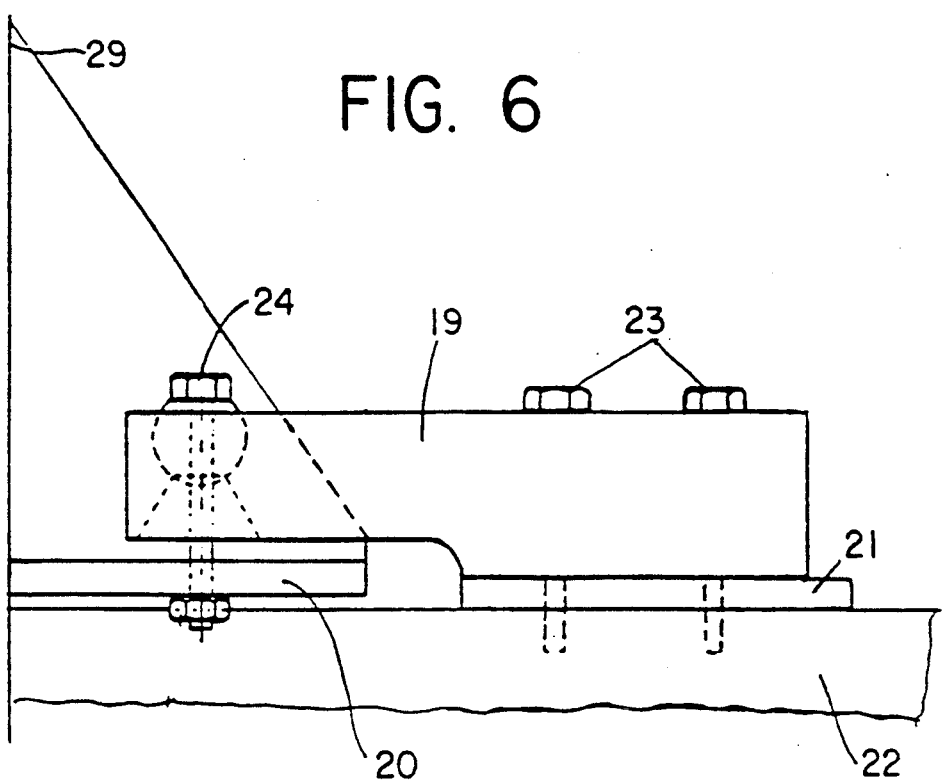
FIG. 6 shows a weighing cell when evenly loaded.
Figure 7:
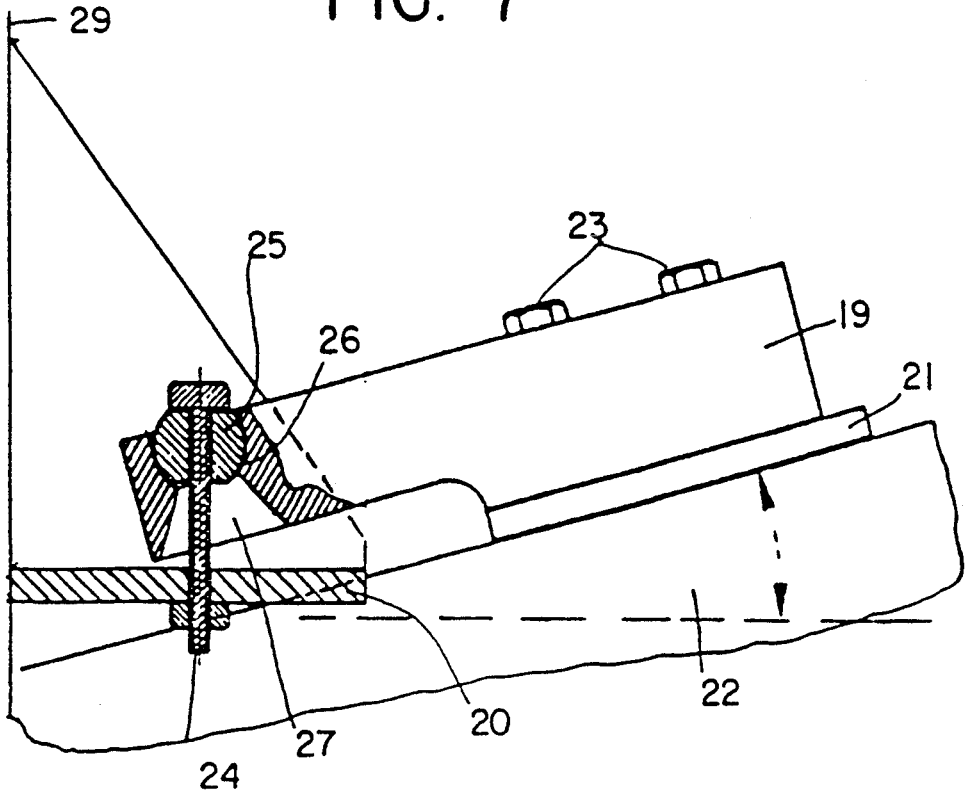
FIG. 7 shows the weighing cell when unevenly loaded.

The suspensions 20 are shown in further detail in FIGS. 6 and 7, where they are secured to the two end walls 29 and form an outwardly protruding horizontally extending plate 20.

Instead of the shown attachment to the end walls 29, the fitting can be secured to the side walls 15 and 28, if the particular construction should call for such an arrangement.

The suspension 20 is provided with a hole in which a bolt 24 is fitted and secured underneath by a nut.

Below the bolt head a spherical body 25 is provided, as shown in FIG. 7. This spherical body 25 rests in a ball socket seat 26 designed in a bar 19 with embedded transducer.

In the bar there is a clearance 27 below the seat 26 so that the bar is free to assume various inclinations relative to the suspension 20, as shown in FIG. 7, without having any influence on the weight. These inclinations may occur when the truck 1 is parked on sloping ground.

By means of bolts 23 the opposite end of the bar is secured to a fitting 21 which is secured to side members 22, as shown in FIG. 4, or to other stationary parts on the refuse container 2 of the truck.

The transducers embedded in each bar 19 are preferably of the strain-gauge-type and are connected to a computing device in the driver's cab in a commonly known manner, where the input of the four weighing cells is monitored, and the quantity of refuse filled into the container is weighed. This permits electronic determination and printout of the weight of the refuse for each emptying.

The method will now be described.

The refuse collection truck 1 stops opposite a container 6 so that the grabbers 5 of the lift 4 can hold it. The container is then lifted, and the refuse dumped into the weighing container 3 whose side slide 13 is in its lower position, as shown in FIG. 3, whereupon the container 6 is returned to its position on the ground.

The identification of the container is then recorded by means of the transponder 7, and the weight of the refuse in the weighing container 3 is recorded by means of the downwards impact on the four weighing cells 19. Following the weighing, the container 3 is emptied, because the cylinders 14 push the side slide 13 upwards, upon which the refuse falls down into the compressor 9 which is then actuated by the hydraulic drive 12, whereby the refuse is compressed and carried to the refuse container 2.

The compressor 9 and the side slide 13 then return to their initial positions.

This makes it possible to print out a list of the refuse quantity of each container which enables billing by quantity. Accurate statistics of the quantity of refuse are also made possible in that the date and time of emptying can be recorded in a commonly known manner.

The entire method can be performed by one person, usually the driver of the refuse collection truck. The method is thus highly rational, and refuse collection becomes quick and very hygienic.

The invention being thus described, it will be obvious that the same may be the right in many ways. Such variations are not to be regarded as a departure from the spirit and scope of the invention, and all such modifications as would be obvious to one skilled in the art are intended to be included within the scope of the following claims.

I claim:

1. A method of collecting and recording parameters concerning refuse involving placing said refuse in a small collection container, lifting the collection container into a refuse collection truck, and dumping the refuse from the collection container into a refuse container of the truck, wherein the dumping step comprises: leading the refuse from the collection container to a weighing container suspended in weighing cells on the truck;

weighing and recording the weight of the refuse; and discharging the refuse from the weighing container into a compressor which moves the refuse into a storage chamber of the refuse container.

2. The method as defined in claim 1, wherein each collection container is provided with an identification transponder and the truck is provided with a radio system for identification of the individual container, and wherein the weighing cell is a transducer which indicates the weight of the dumped refuse, and further including the step of recording in the truck the identification of the collection container as well as the weight of the contained refuse as part of the step of weighing and recording.

3. The method of claim 1 wherein the step of lifting the collection container is accomplished by lift means on the truck.

4. A weighing container for use with a refuse container of a refuse collection truck in weighting refuse, said weighing container being suspended in the refuse container by weighing cells so that the weight of the refuse in the weighing container can be recorded, said weighing container being provided with an opening near its bottom and a slide which can be moved from a position covering the opening near the bottom so that the refuse can be emptied through the opening in the container when the slide is moved.

5. The weighing container as defined in claim 4, wherein the slide is moved by means of two hydraulic cylinders which are secured partly to the weighing container and partly to the slide.

6. The system as claimed in claim 4, wherein the weighing cells comprise four suspension bearings attached on the outside of the weighing container, two at the top of one side of the weighing container and two approximately in the center of an opposite side of the weighing container, and a bar transducer secured to said bearings at one end, the opposite end of which is secured to the refuse container at a stationary part thereof.

7. The weighing container as defined in claim 5, wherein each bar transducer, preferably in the suspension side, has a spherical surface, in which can rest a spherical body secured to the suspension by means of a bolt.

8. The weighing container as claimed in claim 4, wherein the weighing cells comprise four suspension bearings attached on the outside of the weighing container, two at the top of one side of the weighing container and two approximately in the center of an opposite side of the weighing container, and a bar transducer secured to said bearings at one end, the opposite end of which is secured to the refuse container at a stationary part thereof.

9. The weighing container as claimed in claim 8 wherein the bar transducer is of the strain-gauge type.

10. The weighing container as defined in claim 8, wherein each bar transducer, preferably in the suspension side, has a spherical surface, in which can rest a spherical body being secured to the suspension by means of a bolt.

11. The weighing container as defined in claim 4, wherein each bar transducer, preferably in the suspension side, has a spherical surface, in which can rest a spherical body secured to the suspension by means of a bolt.

12. The weighing container of claim 4, wherein the weighing container opening is near the bottom of the weighing container and said slide is moved upwardly to uncover the opening.

13. A system for collecting refuse located in collection containers by means of a refuse collection truck having a refuse container, and recording information about to the collected refuse, comprising a means for lifting the collection container and dumping the refuse from the collection container into the refuse container of the truck;

a weighing container on said truck receiving the refuse dumped into said refuse container of the truck, said weighing container being suspended on said truck by weighing cells such that the weight of the refuse is weighed by the weighing cells;

means connected to the weighing cells for recording the weight of the refuse in the weighing container;

means for discharging the refuse from the weighting container;

a storage chamber for the refuse container; and a compressor means for receiving the refuse from the weighing container and moving the refuse into said storage chamber of the refuse container.

14. A system as claimed in claim 13 wherein said weighing container has an opening and a slide covering said opening, said slide being movable from the opening to allow refuse to be emptied out through the opening formed in the container.

15. A system as in claim 14 wherein the weighing container opening is near the bottom of the weighing container and said slide is moved upwardly to uncover the opening.

16. A system as claimed in claim 14 wherein said slide is movable upwardly and further including at least one hydraulic cylinder for moving the slide upwardly.

17. The system as in claim 16 wherein the slide is moved by means of two hydraulic cylinders which are secured partly to the weighing container and partly to the slide.

18. The system as claimed in claim 13 wherein said weighing cells comprise a plurality of suspension bearings attached to the weighing container, at least one of said bearings being at the top of one side of the weighing container and at least one of said bearings being approximately in the center of an opposite side of the weighing container; and a bar transducer secured to said bearings at one end, opposite ends of said bar transducer being secured to the refuse container of the truck at a side member thereof.

19. The system as claimed in claim 18 wherein the suspension bearings include a spherical bearing attached to the side member of the refuse container by a bolt, said bar transducer has a spherical ball-and-socket seat for receiving the spherical bearing, and an angular clearance being provided below the spherical bearing in the direction towards the side member of the refuse container, whereby the weighing container may assume various inclinations with respect to the truck.

20. A system as claim in claim 13 wherein the collection containers contain an identification transponder and said recording means includes a radio system for receiving identification information from said transponder.

21. A system as claimed in claim 20 wherein said recording means records the identification information as well as the weight.

22. A system as in claim 13 wherein the means for lifting is lift means is the truck.

* * * * *